United States Patent [19]

Schnee

[11] Patent Number: 4,768,739
[45] Date of Patent: Sep. 6, 1988

[54] EMERGENCY WARNING AND SIGNALING SYSTEM

[76] Inventor: Robert A. Schnee, 2905 Pacific Ct., Irving, Tex. 75062

[21] Appl. No.: 941,640

[22] Filed: Dec. 15, 1986

[51] Int. Cl.$^4$ ............................................. B64D 17/16
[52] U.S. Cl. ................................ 244/146; 244/153 R; 244/31; 116/210
[58] Field of Search .................. 244/33, 31, 146, 145, 244/153 R; 116/26

[56] References Cited

U.S. PATENT DOCUMENTS

| | | |
|---|---|---|
| 2,470,783 | 5/1949 | Mead . |
| 2,769,605 | 11/1956 | Sparkman . |
| 2,778,332 | 1/1957 | Talbot . |
| 2,960,298 | 11/1960 | Jones . |
| 3,002,490 | 10/1961 | Murray . |
| 3,131,895 | 5/1964 | Moore . |
| 3,279,419 | 10/1966 | Demarco . |
| 3,285,546 | 11/1966 | Jalbert ................................. 244/145 |
| 3,395,877 | 8/1968 | MacFadden et al. . |
| 3,412,963 | 11/1968 | Struble, Jr. ........................... 244/146 |
| 3,620,486 | 11/1971 | Charpentier ......................... 244/146 |
| 3,721,983 | 3/1973 | Sherer . |
| 3,740,008 | 6/1973 | Grauel .............................. 244/153 R |
| 3,791,611 | 2/1974 | Babbidge ........................ 244/153 R |
| 3,806,071 | 4/1974 | Brown ............................. 244/153 R |
| 3,881,531 | 5/1975 | Rossi . |
| 3,998,408 | 12/1976 | Caldwell ............................. 244/145 |
| 4,044,711 | 8/1977 | Jamison . |
| 4,102,296 | 7/1978 | Felix . |
| 4,120,259 | 10/1978 | Wilson . |
| 4,281,427 | 8/1981 | Petters . |

OTHER PUBLICATIONS

Life-A-Line; Rossam Industries, Inc.; pp. 1-4.

Primary Examiner—Galen Barefoot
Attorney, Agent, or Firm—Michael A. O'Neil

[57] ABSTRACT

A warning and signaling system includes a kite attached to a flexible tether rope wherein one end of the rope is secured to a person or a lifeboat. The kite is made from a material having high visibility and includes radar reflective material. The tether rope may carry an antenna for a radio transmitter and receiver. An optional inflatable chamber provides rigidity to the kite. The kite may be provided with a tail having radar reflective swatches attached thereon.

6 Claims, 2 Drawing Sheets

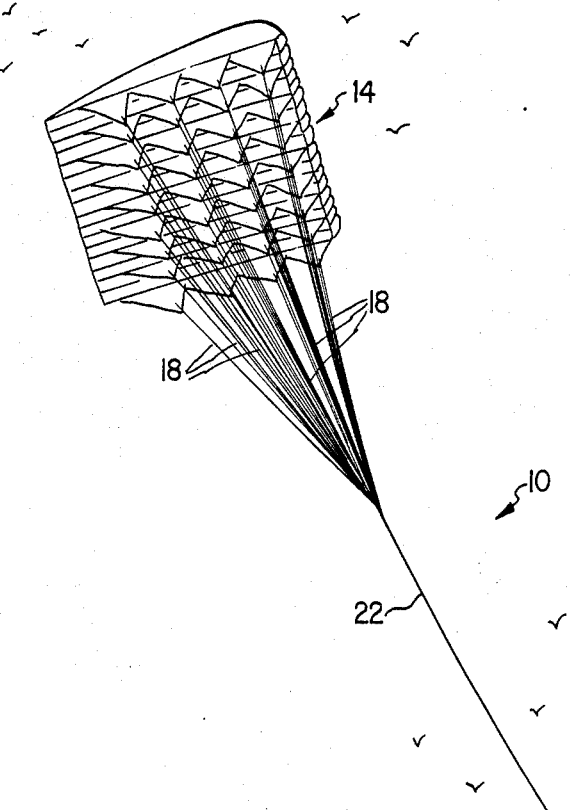
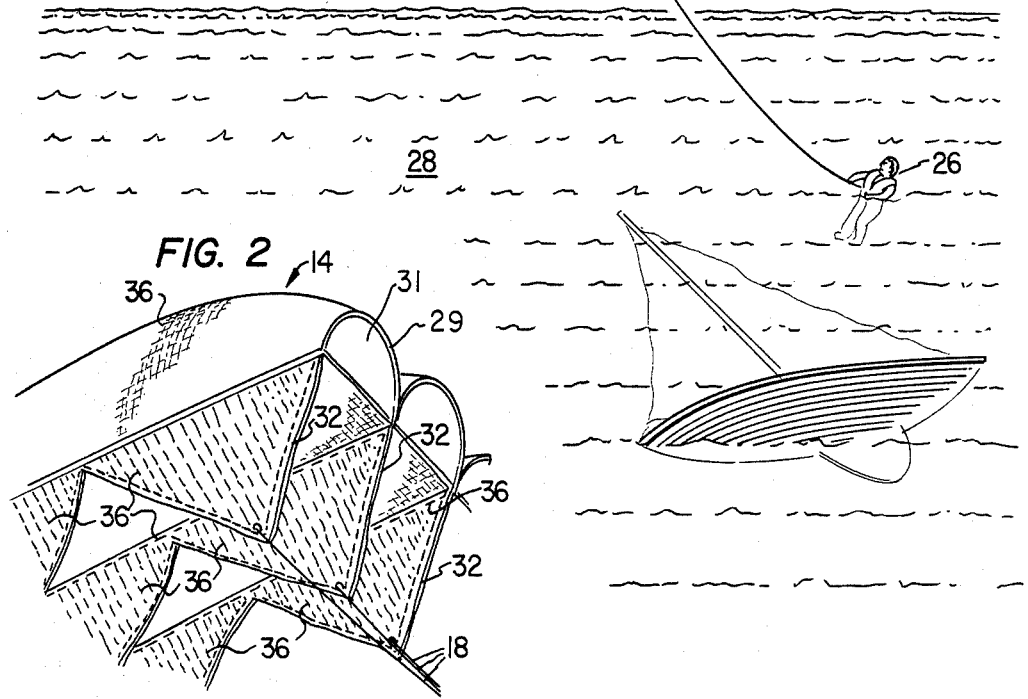
FIG. 1
FIG. 2

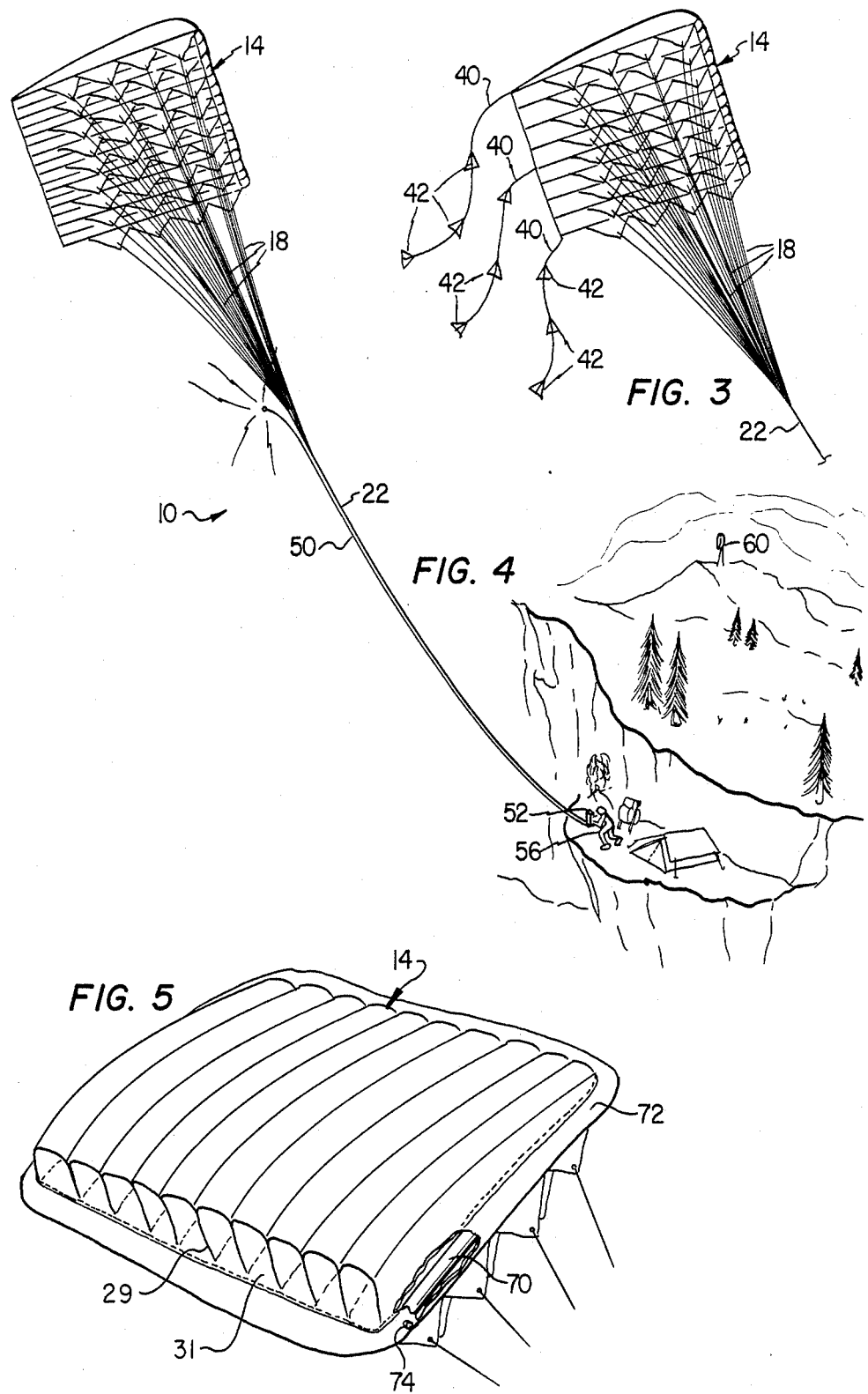

EMERGENCY WARNING AND SIGNALING SYSTEM

TECHNICAL FIELD

This invention relates to an emergency warning and signaling system, and specifically to an emergency kite to be used as a distress marker and signal device to assist in maritime and other rescue operations.

BACKGROUND OF THE INVENTION

Perhaps the most difficult task of marine rescue operations is locating the person or persons to be rescued. Ocean waves typically have a height of 3-6 feet. Because most life rafts have vertical heights of less than 36 inches, the life raft and its occupants may not be visible from the sea or from a helicopter for up to 50% of the time. A swimmer in the open ocean is nearly impossible to see unless the searchers are very close to the swimmer. Alpine and desert rescue operations are also very difficult because of reduced visibility, possible injury and/or death due to cold or heat exhaustion, and the lack of moisture. These and other problems greatly reduce the efficiency and successfulness of any search operation and consequently rescue missions under such circumstances are extremely costly, time-consuming and difficult.

One prior art attempt at increasing the visibility of a swimmer, life raft, etc., and thereby enhancing the effectiveness of search missions involves the use of a balloon having a highly visible color and/or radar reflective surfaces secured to the swimmer by tether ropes, filled with a lighter-than-air gas and set aloft. The balloon provides increases visibility and also permits the use of radar in search missions.

Unfortunately, a balloon has several drawbacks. For instance, to carry the balloon aloft, a canister of compressed lighter-than-air gas must be provided for injection into the balloon. The canister must be periodically checked and refilled with gas. The combination of canister and balloon is heavy, cumbersome and difficult to use. Because the gas will seep out of the balloon, over time the balloon gradually loses buoyancy. Unless another canister of compressed gas is available, the balloon may no longer be sent aloft.

SUMMARY OF THE INVENTION

The present invention comprises an emergency warning and signaling system which overcomes the foregoing and other difficulties of the prior art. In accordance with the present invention, a kite is utilized as an enhanced visibility warning and signaling device. The wind is nearly always blowing over large bodies of water and is thus available to carry the kite aloft. As opposed to balloon systems, the use of a kite alleviates the need for gas canisters and thereby reduces the cost and eliminates the problem of loss of buoyancy due to gas seepage. The kite may also be used as a sail.

The kite is especially useful in providing a warning and signaling device to boaters and sailors for maritime rescue operations. However, the kite is also useful for injured skiers, particularly in remote areas such as those skiers involved in helicopter skiing. Injured, exhausted or sick hikers or other outdoor activity participants may make excellent use of the kite as such people are typically isolated and immobile.

The kite may be used as part of a first aid kit, or as part of a survival kit for an automobile or recreational vehicle. The kite may also be used as a warning device on the highways to alert highway patrolmen or other law enforcement or search and rescue personnel that there is a problem in a particular area. Because the instant invention does not require heavy canisters or other such cumbersome equipment, it is very convenient and useful for hikers, backpackers, skiers and other recreational users.

The design of the kite is important in the present invention because the kite must be buoyant in a light wind without any movement by the holder of the kite. Thus, a parafoil kite is one preferred design.

The kite is made of lightweight material which dries quickly and packs into a very small container that is neither heavy nor cumbersome. The kite may be significantly larger and lighter than a balloon and yet more compact. Because the device is inexpensive, lightweight and small, it is much more likely to be used than prior art devices.

According to a preferred embodiment of the invention, the kite is made of radar reflective material. In an alternate embodiment, the material has radar reflective thread sewn therein. According to another embodiment of the present invention, the kite has a radar reflective tail and an antenna for a radio transmitter/receiver which is carried aloft by the kite. According to another embodiment, the tail has radar reflective swatches attached thereto. In still another embodiment of the invention, the kite is provided with a narrow, inflatable compartment that, when inflated, increases rigidity to make it easier to fly the kite. Radar reflective material may be sprinkled into the inflatable compartment to provide or increase radar reflectivity.

BRIEF DESCRIPTION OF THE DRAWINGS

A more complete understanding of the invention may be had by reference to the following Detailed Description when taken in conjunction with the accompanying Drawings wherein:

FIG. 1 is a perspective view of a first embodiment of an emergency warning and signaling system according to the present invention in a maritime application;

FIG. 2 is a partial perspective view of the system of FIG. 1;

FIG. 3 is a partial perspective view of a second embodiment of the invention;

FIG. 4 is a perspective view of a third embodiment of the of the present invention in an alpine application; and FIG. 5 is a top view of a fourth embodiment of the invention.

DETAILED DESCRIPTION

Referring now to the drawings, and particularly to FIG. 1 thereof, there is shown an emergency warning and signaling system 10 comprising a kite 14 attached by a plurality of mooring lines 18 to a tether rope 22. A swimmer 26 is shown in a body of water 28 and the tether rope 22 is attached to the swimmer 26.

Referring now to FIG. 2, a lower perspective view of one of the corners of the kite 14 is shown. The kite 14 shown in FIG. 2 has a parafoil design so that it may be carried aloft by a very light wind without movement by the holder of the kite. As is well-known in the prior art, an airfoil is a wing corresponding to an airplane wing airfoil and having longitudinally extending ribs providing longitudinal channels for the flow of air from a relatively large opening on the front of the wing and a restricted opening upon the rear of the wing for the escape of air. In the present case, also as is well-known in the art, the kite 14 has longitudinally extending ribs 29 forming longitudinal channels 31 for the flow of air. The mooring lines 18 are attached to the body of the parafoil kite 14 by way of triangular patches 32. As shown in FIG. 2 radar-reflective threads 36 are sewn into the material of the kite 14.

The kite 14, mooring lines 18 and tether rope 22 comprise a lightweight device that may be easily folded into a small volume and carried in a pocket. The kite 14 is made from any highly visible, lightweight material such as fluorescent orange rip-stop nylon. The kite 14 may be made of radar-reflective material or have radar-reflective threads 36 or the kite 14 may be dusted or painted with radar-reflective materials. The mooring lines 18 and tether rope 22 are preferably strong, lightweight rope elements such as nylon lines.

Referring now to FIG. 3, a second embodiment of the invention is shown. In the second embodiment, tails 40 are attached to the back of the kite 14 and radar-reflective swatches 42 are attached to the tails 40. The radar-reflective swatches 42 increase the radar visibility of the kite 14 and may be used in place of radar-reflective material or radar-reflective threads 36. The swatches 42 may be made of a light-reflecting material to catch sunlight and draw visual attention to the kite. Alternatively, the tails 42 themselves may be made of radar reflective material and may be used in combination with or in place of the swatches 42, the radar-reflective material, or the radar-reflective threads 36 to increase the radar visibility of the kite 14.

Referring now to FIG. 4, a third embodiment of the emergency warning and signaling system 10 is shown in use in an alpine rescue operation. In addition to the kite 14, mooring lines 18 and tether rope 22, the third embodiment shown in FIG. 4 also includes an antenna 50 attached to a radio receiver/transmitter 52 held by a hiker 56. The radio transmitter/receiver 52 and antenna 50 are any of those known in the art. The kite 14 carries the antenna 50 aloft and the hiker 56 may use the radio receiver/transmitter 52 to receive signals from and/or transmit a warning signal to a transmitter/receiver 60. The signal from the transmitter/ receiver 52 may be used to locate the hiker 56.

FIG. 5 shows a top view of a fourth embodiment of the kite 14. In this embodiment, a small chamber 70 is sewn into the fabric 72 around the periphery of the kite 14. The chamber 70 is located below the ribs 29 and channels 31. A nozzle 74 is provided so that the user may blow air into the chamber 70. When inflated, the chamber 70 provides rigidity to the kite 14 so that it is easier to fly the kite 14 in the wind. Increased rigidity is especially helpful when the kite 14 is wet; once the kite is aloft, the lightweight material quickly dries. Of course, the chamber 70 may have other shapes, such as ribbing along the length of the kite or a circular shape. In an alternate embodiment of the invention, radar reflective material such as finely powdered aluminum oxide or magnesium oxide or another metal oxide is sprinkled into the chamber 70 to increase the radar visibility of the kite 14.

Although preferred embodiments of the invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

What is claimed is:

1. An improved emergency warning and signaling system including an airfoil kite of pliable material in the form of a wing having a plurality of longitudinally extending ribs with the ribs providing a plurality of longitudinal channels for the flow of air to lift the kite, wherein the improvement comprises:
   an enclosed, inflatable chamber attached to the wing around the periphery of the kite below the longitudinal channels for facilitating the flow of air through the channels to lift the kite;
   a tether rope for securing the kite to a fixed location;
   a plurality of mooring lines for attaching the tether rope to the kite; and
   radar reflective material associated with the kite to enhance the probability that a search party will locate the kite.

2. The system of claim 1, further comprising a tail attached to the kite.

3. The system of claim 2, further comprising a plurality of reflective swatches attached along the length of the tail.

4. The system of claim 1, further comprising an antenna affixed to the tether rope and a transmitter for transmitting a warning signal when activated.

5. The system of claim 1, wherein the kite is made of rip-stop nylon fabric.

6. An improved kite as in claim 1 wherein the enclosed, inflatable chamber maintains the longitudinal channels of the wing in fixed spaced relationship to each other to facilitate the flow of air through the channels when the kite is wet.

* * * * *

UNITED STATES PATENT AND TRADEMARK OFFICE
CERTIFICATE OF CORRECTION

PATENT NO. : 4,768,739
DATED : Sep. 6, 1988
INVENTOR(S) : Robert A. Schnee

It is certified that error appears in the above-identified patent and that said Letters Patent is hereby corrected as shown below:

Column 2, line 65 and 66,
  "airfoil" should be —parafoil—.

Column 4, line 21,
  "airfoil" should be — parafoil—.

Signed and Sealed this

Eighteenth Day of April, 1989

Attest:

DONALD J. QUIGG

Attesting Officer

Commissioner of Patents and Trademarks